Figure 1:
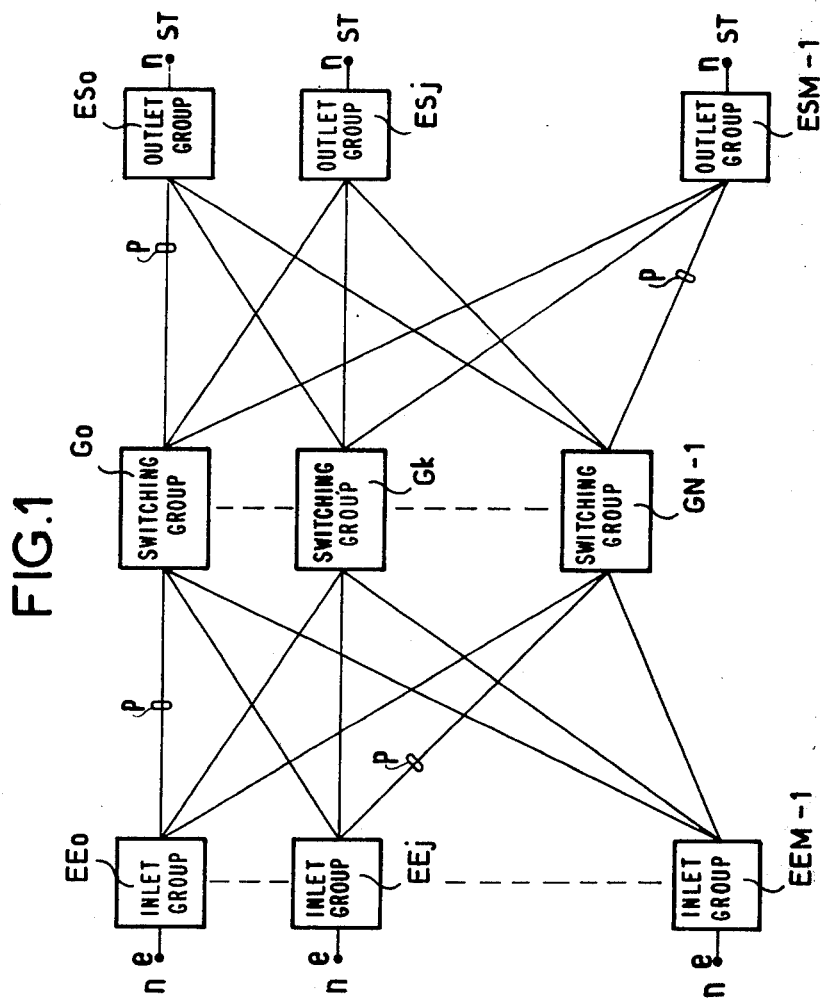

United States Patent [19]

Deglin et al.

[11] 4,144,406

[45] Mar. 13, 1979

[54] TIME-MULTIPLEX MODULAR SWITCHING NETWORK FOR AUTOMATIC EXCHANGE

[75] Inventors: René Deglin, Velizy Villacoublay; Françoise Crapet, Maurepas, both of France

[73] Assignee: Compagnie Industrielle des Telecommunications Cit-Alcatel, Paris, France

[21] Appl. No.: 840,444

[22] Filed: Oct. 7, 1977

[30] Foreign Application Priority Data

Oct. 19, 1976 [FR] France .................. 76 31364

[51] Int. Cl.² ..................... H04J 3/00; H04L 5/00
[52] U.S. Cl. .................... 178/50; 179/15 BA
[58] Field of Search .......... 178/50; 179/15 A, 15 BA, 179/15 BV

[56] References Cited

U.S. PATENT DOCUMENTS

| | | | |
|---|---|---|---|
| 3,366,737 | 1/1968 | Brown, Jr. .................. | 179/15 BA |
| 3,804,987 | 4/1974 | Cooper ...................... | 178/50 |
| 3,912,872 | 10/1975 | Callens ...................... | 179/15 A |

Primary Examiner—Thomas A. Robinson
Attorney, Agent, or Firm—Sughrue, Rothwell, Mion, Zinn and Macpeak

[57] ABSTRACT

The time-switching network according to the invention has an inlet stage, an outlet stage, and a selection switching stage, respectively comprising M, M, and N groups. It includes line equipments; each inlet stage group has a storage function, the same applying to each outlet stage group and each selection switching stage group. All inlet storages have access to each switching memory via one inlet selection multiplexer per switching group, the output of each inlet storage being multipled to one inlet of each such selector; all switching memories are accessible from each outlet storage via an access selector, the outlet of each switching memory being multiplied to one point of each outlet access selectors' field; the overall system is a full access (non-blocking) switching network.

8 Claims, 4 Drawing Figures

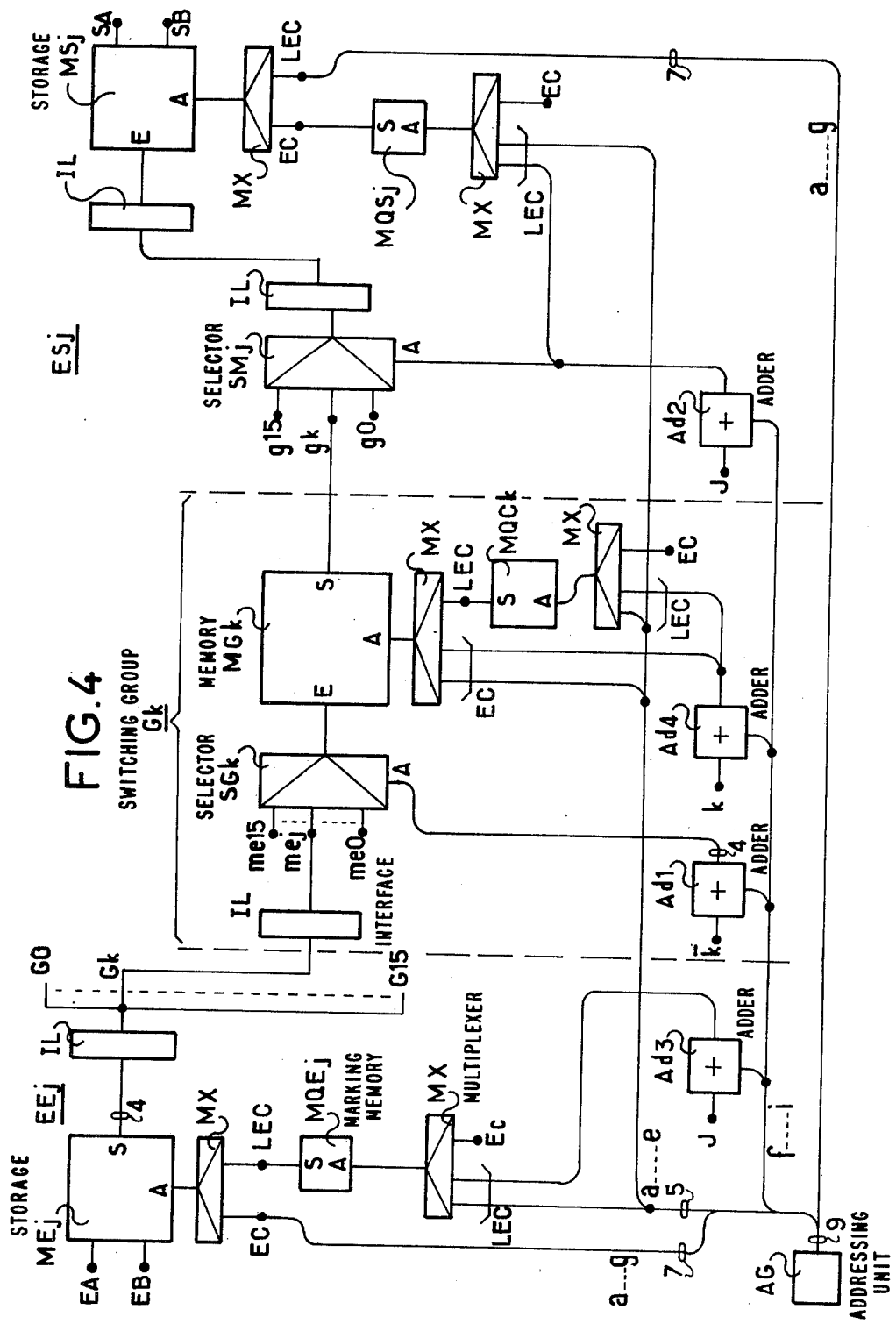

TIME-MULTIPLEX MODULAR SWITCHING NETWORK FOR AUTOMATIC EXCHANGE

The invention is a time multiplex switching network suitable for application in telecommunications and more particularly in telegraphic exchanges.

Several time-multiplex systems are known in telegraphic switching. Such switching systems are indeed very suitable for the handling of telegraphic characters, which are offered to them already in a form most suitable for application of "time switching" techniques, namely binary impulses. In the known systems, the unit of intelligence conveyed through the time-switching exchange is usually composed of one or several characters which implies code recognition at inlets and code restitution for retransmission at outlets.

The time-switching network according to the invention, in contrast samples each telegraphic code element appearing at each inlet at intervals which are very short as compared with the duration of an element, thereby introducing very little phase-distortion and being, moreover, a transparent switching system. The samples are assembled into digital words at the input to the system, of a uniform length determined to obtain maximum line connect capacity, and the maximum code element sampling rate is determined by system technology.

The time-switching network according to our co-pending patent application Ser. No. 780,394 filed March 23, 1977, has a matrix structure, each switching group being sub-divided into sub-groups, said sub-groups each comprising an input memory and an output memory, which are connected to a common bus serving the group. This structure has disadvantages from the standpoints of the volume of memory required, and the protection of the group-parallel common buses, which are sensitive to interference.

The present invention provides a more easily applied and protected switching network.

The time-switching network according to the present invention comprises an inlet stage composed of M groups, an outlet stage composed of M groups, and a selection stage composed of N groups; it comprises a number of line equipments, an inlet storage in each group of the inlet stage, and an outlet storage in each group of the outlet stage; the network is characterised by the fact, that each switching group has a single memory; that all the inlet storages obtain access to each group memory through a group selector-multiplex, the output of each said inlet storage being multiplexed to an input of each inlet selector; that each switching group memory has access to each outlet group storage through an outlet access selector, the output of each group memory being multipled to one input of each outlet access selector, and that the overall network is non-blocking.

According to another characteristic of the invention, memory and storage addressing, multiplexed to permit the use of either a common addressing unit or of marking memories, employs adders for automatic address off-set shifting according to source or destination group number of the data to be read into or out of memory or storage, thereby simplifying control of sample bit switching through the network.

Figure 2:
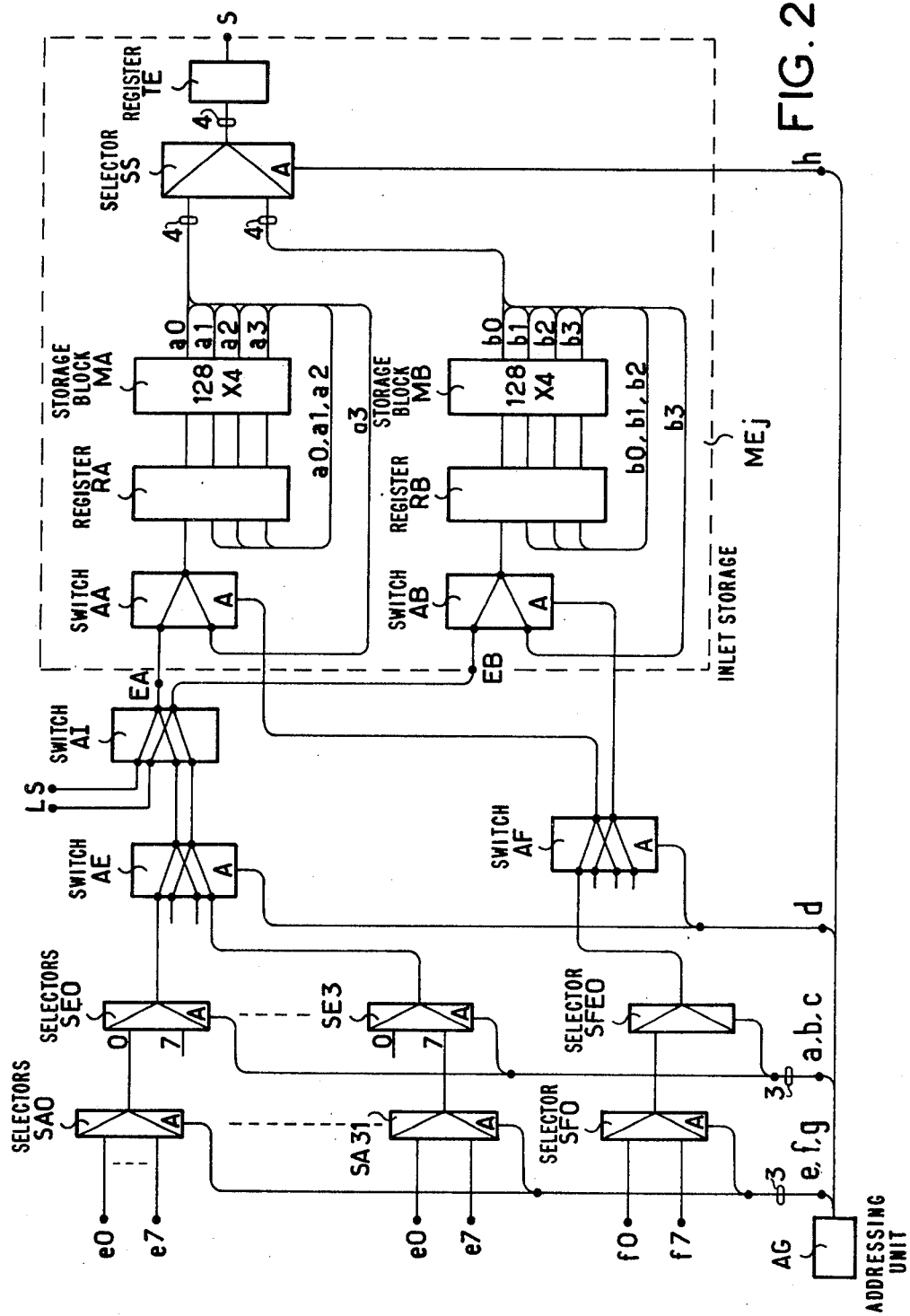
Figure 3:
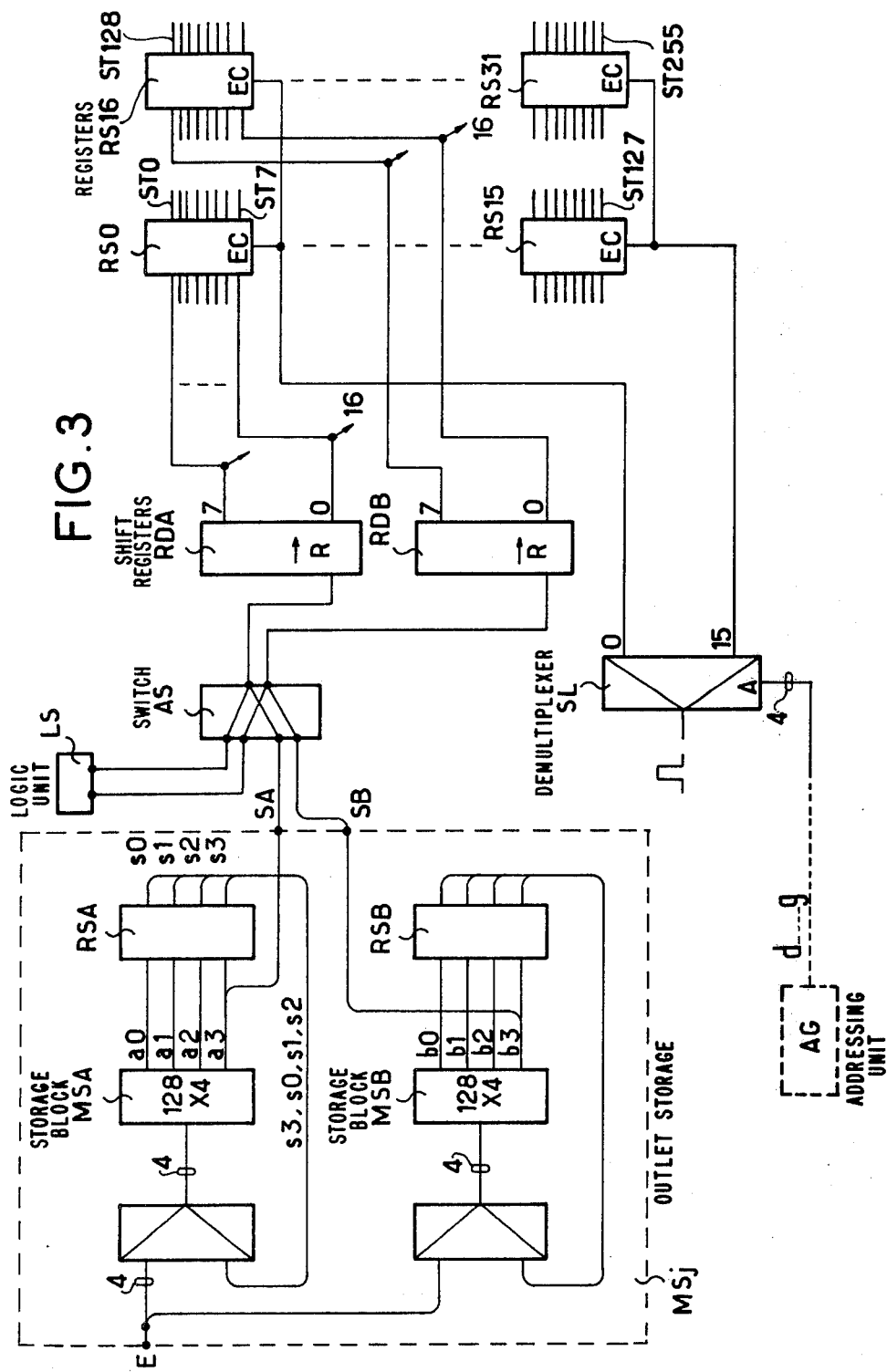

What follows is a description of an embodiment of the invention, as a non-restrictive example of its application to a telegraphic exchange, with reference to the accompanying drawings, which represent:

FIG. 1: the general structure of the time-switching network;

FIG. 2: an inlet stage group of a capacity capable of accepting 256 i/c telegraphic channels;

FIG. 3: an outlet stage group of the same (o/g) capacity; and

FIG. 4: the paths followed by one sample bit through the network, and the addressing circuits.

The example described and represented in FIG. 1 has an inlet stage composed of M inlet groups EE0 to EEM-1, an outlet stage composed of M outlet groups ES0 to ESM-1, and between these two stages, N switching groups G0 to GN-1, forming the selection stage. Trunking provides full access, i.e. a connection between each inlet group and each switching group, and between each switching group and each outlet group. Trunks are composed of P wires in parallel. In the particular embodiment of the invention described below, $M = N = 16$, and $P = 4$, and the system transfers 4 bits in parallel per communication between any inlet e and any outlet ST, each inlet group having n inlets and each outlet group n outlets, for example $n = 256$. One inlet group such as EEJ and one outlet group such as ESJ are assembled in a single module design, thus constituting a modular system as described in our above referenced patent application Ser. No. 780,394.

FIG. 2 represents an inlet group EEJ with a capacity of 256 incoming channels connected to the inputs e0 to e7 of 32 selectors SA0 to SA31, which are 8-input multiplexers addressed by a common addressing unit AG. The latter is clocked to deliver 9 bits a, b, c, d, e, f, g, h, i, in order of increasing significance, and thus having a capacity of 512 addresses. The selectors SA0 to SA31 are addressed with bits e, f and g. Their 32 outputs are re-grouped at the inputs of 4 selectors of the same type SE0 to SE3, which are addressed with bits a, b and c. Finally, the 4 outputs of selectors SE0 to SE3 are concentrated onto two channels by a switch AE controlled with the bid d. These two channels connect to inlet storage MEJ pertaining to group EEJ, said storage being arranged in two blocks MA and MB which are simultaneously written and successively read.

A switch AI directs either the two channels from AE, or two channels from other devices using the network (reference may be had to our patent application Ser. No. 780,394) to the storage blocks MA and MB, of which MA, of 128 four-bit words capacity, is loaded by 4-bit register RA. The latest sample bit enters register RA at input 0, and MA outputs a0, a1, a2 are coupled back to RA inputs 1, 2 and 3, so that each memory word always contains the latest 4 bits representing the polarity on an i/c telegraph channel.

Storage block MB is of the same structure. An outlet selector SS is controlled by the common addressing unit AG using bit h and accesses the output S of the group from either MA or MB, through a buffer register TE.

In a telegraphic application, the sample bit channels from the line equipments may be followed by wires provided for fault indication and to prevent disturbance of the system by line equipment faults: these wires are then connected at inputs f0 to f7 of further selectors SF0 to SF31 and trunked to SFE0–SFE3 as described in respect to SA0–SA31 and SE0–SE3. Concentration onto two wires is through a switch AF controlling access to registers RA and RB via switches AA and AB. On appearance of a fault, it is bit a3 from MA (or b3 from MB) which is loaded into register RA (or RB).

FIG. 3 represents an outlet stage group such as ESJ. Outlet storage MS of the group is divided into two blocks MSA, MSB, of 128 four-bit words capacity each, and which are loaded in succession and read simultaneously. For a given location, the reading rate is four times faster than the writing rate, since each location contains 4 sample bits (one four-bit word), and the bits are read out in succession. As described in our patent application Ser. No. 780,394, MSA and MSB are loaded through input E and rewritten after each readout, so as to offer the next sample for next reading at output a3 and b3.

A switch AS is connected to the outlet demultiplex and integrate assembly and directs thereto either:
 the two outputs SA, SB of outlet storage MSj for retransmission of the sample bits conveyed through the time-switching network; or
 the output from another device, for example, as described in our patent application Ser. No. 780,394, a signalling logic unit LS connected for direct transmission to line;

The purpose of the outlet demultiplexer is to transmit the sample bits to their appropriate outlets, and that of the integrator to restore the original telegraphic code elements according to the sample bits received. This assembly is also in two blocks, each handling a frame of 128 time-slots te.

Demultiplexing is performed by shift registers RDA and RDB of 8 stages each, through which the sample bits step at the rate of the time slots te. Every 8 te, the bits in these registers RDA, RDB, are transferred to 2 sets of 16 8-bit registers such as RS0-15, RS16-31, composed of D type flip-flops. One register in each set is selected by a demultiplexer SL, when addressed by the common addressing unit AG with bits d, e, f, g. Thus, the sets of registers, loaded with a sample pulse frame every 128 te, integrate the pulses to reconstitute the code elements on the o/g telegraphic channels.

As indicated in FIG. 1, each inlet group EE0 to EEM-1 has access to any switching group G0 to GN-1 on a 4-bit parallel trunk. Similarly, each switching group has access to any outlet group ES0 to ESM-1, also on a 4-bit parallel trunk.

FIG. 4 is a diagram of the connections provided between the major units constituting the time switching network. As shown, an inlet group EEj and an outlet group ESj which are any of groups EE0 - EEM-1 and ES0 - ESM-1 each have a storage, respectively MEj and MSj, of the same 256 four-bit words capacity.

To form a full access (non-blocking) time-switch, a switching group Gk which is any of groups G0 - GN-1, has a memory MGk of 512 four-bit words capacity.

Sample bits are conveyed through the system by two transfers, namely from MEJ of an inlet group to MGk of a switching group, and from MGk to MSj of an outlet group. These transfers are organized by common addressing unit AG, using the marking memories MQEj, MQGk, and MQSj, which are loaded by connection logic according to the inlet-outlet relations to be provided as directed by exchange common control. Interfaces IL provide connections between storage MEj and selector SGk and between selector SMj and storage MSj.

For organisation of these transfers, the storages and memory addressing A is performed by multiplexers MX, which separate write and read addressing EC and LEC.

The common addressing unit AG supplies the write addresses of inlet storages MEj and switching group memories MGk, and the read addresses of outlet storages MSj and all marking memories.

The read addresses of the inlet storages and switching group memories and the write addresses of the outlet storages, are supplied by the marking memories, which are addressed and loaded by exchange control units not shown in the diagram.

The common addressing unit AG also provides clocks: the nine bits a to i define $2^9 = 512$ time slots te, each of which is split into 2 half periods, one for writing in storage or memory, the second for reading said storage or memory, or vice-versa, according to the function of the device; the four bits f to i define $2^4 = 16$ time intervals IT, comprising 32 te each.

Inlet storage MEj, composed of two blocks of 128 four-bit words, is loaded in "block parallel" on two multiplex channels each conveying one frame te of 128 time-slots te, from input multiplexing assembly MX. When write addressing MEj, the common addressing unit AG allocates one 4-bit storage location (or word) to each incoming telegraphic channel: consequently each of the $128 \times 2 = 256$ words in MEj stores one sample bit from its channel in each 128 te period. Reading is performed at a rate four times slower than writing, and is on 4 bits in parallel, so that transmission through the system is word-serial, 4-bit parallel from this point.

As the read output of an inlet storage such as MEj has access to all switching stage memories such as MGk, MG memories are divided into 16 of 32 four-bit words, each provided to store sample words from a given ME, access to each MG memory field being through a selector such as SGk, switched to admit the data from that ME storage. The common addressing unit AG allocates a time interval IT:

$$IT = 4 \times 128 \text{ te}/16 = 32 \text{ te}$$

for the filling of each field, one te being thus allocated to each word in the field of 32 words.

The read output of a memory such as MGk has access to all outlet storages such as MSj, through a selector SMj set to admit the data from the memories MG. The common addressing unit AG allocates a time interval IT = 32 te for transfer of data from one memory MG, during which time words are transferred from the memory MG to any word location in MSj at the rate of one per time slot te. The MSj location is designated by marking memory MQSj according the connection to be made.

An outlet storage such as MSj is also composed of two 128 four-bit word blocks, so that two multiplex channels connect it to the output demultiplex assembly, to which they convey two output frames Ts of 128 te each. MSj words are read out in bit serial at four times the writing rate.

During each time interval IT, the memories MG receive 32 words from a different storage ME. They have however only one word input.

The same applies to outlet storages such as MSj with respect to the MG memories.

This demands phase-shifting of the frames of the same form at the outputs of both the ME and the MG storages.

Hence, and in addition also for correct processing of the frames shown in the table at the end of the description, a number of adjustments are required:

a. unavoidably, in the addressing of access selectors such as SGK and SMj. The shift for SGk is accompanied by a complementary shift in write addressing of its MG memory, for storage in field 0 of the words from ME0, in field 1 those from ME1, etc, up to field 15 in ME15. This is not unavoidable necessity but provides a loading mode for MG memories that is similar to that of the marking memories such as MQEj, MQGk, MQSj.

b. for commodity, in the read addressing of the marking memories such as the above for although not a necessity, this provides a uniform loading mode in the allocation of storage and memory locations by these marking memories.

All the addresses to be offset are processed on the basis of the 4 most significant bits f to i issued by the common addressing unit AG (definition of the 16 MG fields), the actual addresses being formed by specific correction with four 4+4 bit adders, which receive the bits f to i at one 4-wire input, and a 4-bit number on the other, the latter number being wired according to the group in question:

an adder Ad1 in each switching group addresses a selector such as SGk. Its wired-value input introduces the 16's complement ($\bar{k}$) of the 4-bit group number (k);

An adder Ad2 in each outlet group addresses a module selector such as SMj, and also supplies the 4 most significant read addressing bits to a marking memory such as MQSj. Its wired-value input introduces the 16's complement ($\bar{j}$) of the four-bit outlet group address (j);

An adder Ad3 in each inlet group receives the wired group number and supplies the four most significant of the read address bits for an inlet marking memory such as MQEj.

An adder Ad4 in each switching group receives the wired group number (k) and supplies the most significant bits of (a) the group memory MG write address, and (b) the read address of the corresponding marking memory such as MQCB.

The table details the forming of the frames entering and leaving the stages EE, G and ES in the time interval IT = 32 te allocated by common addressing circuit GA.

Equivalent means may be used instead of those described within the scope of the invention, and the storage and memory, group and overall system capacities stated are to be understood purely as non-restrictive examples.

Table

This table shows the frames (assembled pulse trains) transmitted between stages.

TIME IDENTIFICATION

4 × 128 te or 16 × 32 te

| IT | . 0 . 15 . 14 . 13 . 12 . 11 . 10 . 9 . 8 . 7 . 6 . 5 . 4 . 3 . 2 . 1 . 0. |

FRAME LEAVING ME (for G)

| ME0 | . 0 . 15 . 14 . 13 . 12 . 11 . 10 . 9 . 8 . 7 . 6 . 5 . 4 . 3 . 2 . 1 . 0. |
| ME1 | . 1 . 0 . 15 . 14 . 13 . 12 . 11 . 10 . 9 . 8 . 7 . 6 . 5 . 4 . 3 . 2 . 1. |
| ME15 | . 15 . 14 . 13 . 12 . 11 . 10 . 9 . 8 . 7 . 6 . 5 . 4 . 3 . 2 . 1 . 0 . 15. |

FRAME ARRIVING AT G (from ME)

| G0 | . 0 . 1 . 2 . 3 . 4 . 5 . 6 . 7 . 8 . 9 . 10 . 11 . 12 . 13 . 14 . 15 . 0. |
| G1 | . 1 . 2 . 3 . 4 . 5 . 6 . 7 . 8 . 9 . 10 . 11 . 12 . 13 . 14 . 15 . 0 . 1. |
| G15 | . 15 . 0 . 1 . 2 . 3 . 4 . 5 . 6 . 7 . 8 . 9 . 10 . 11 . 12 . 13 . 14 . 15 |

FRAME LEAVING G (for MS)

| G0 | . 0 . 15 . 14 . 13 . 12 . 11 . 10 . 9 . 8 . 7 . 6 . 5 . 4 . 3 . 2 . 1 . 0. |
| G1 | . 1 . 0 . 15 . 14 . 13 . 12 . 11 . 10 . 9 . 8 . 7 . 6 . 5 . 4 . 3 . 2 . 1. |
| G15 | . 15 . 14 . 13 . 12 . 11 . 10 . 9 . 8 . 7 . 6 . 5 . 4 . 3 . 2 . 1 . 0 . 15. |

FRAME ARRIVING AT MS (from G)

| MS0 | . 0 . 1 . 2 . 3 . 4 . 5 . 6 . 7 . 8 . 9 . 10 . 11 . 12 . 13 . 14 . 15 . 0 |
| MS1 | . 1 . 2 . 3 . 4 . 5 . 6 . 7 . 8 . 9 . 10 . 11 . 12 . 13 . 14 . 15 . 0 . 1 |
| MS15 | . 15 . 0 . 1 . 2 . 3 . 4 . 5 . 6 . 7 . 8 . 9 . 10 . 11 . 12 . 13 . 14 . 15 |

What we claim is:

1. A time multiplex modular switching network for use in an automatic exchange serving lines carrying binary signals comprising an inlet stage composed of M inlet groups each having n inlets and inlet storage means for storing n binary signals, an outlet stage composed of M outlet groups each having n outlets and outlet storage means for storing n binary signals, and a selection switching stage divided into N switching groups each having a switching group memory for storing 2n binary signals, a selection multiplexer for providing all inlet storage means with access to each of the switching group memories, the output of each inlet storage means being connected to one inlet of said selection multiplexer in each switching group, and an access selector for providing all switching group memories with access to each outlet stage storage means, the output of each switching group memory being connected to one input of the access selector corresponding to each outlet group, whereby the overall network constitutes a full access switching system.

2. The switching network according to claim 1, in which each storage means and memory is addressed through a corresponding marking memory in the storage means or memory's group and by a common addressing unit which is clocked to deliver a binary word used for the write addressing of inlet storage means and of the switching group memories and the read addressing of marking memories and of outlet storage means, the most significant digits of said binary word being used for addressing of the selection multiplexers and the access selectors.

3. The switching network according to claim 2, further comprising, a first adder for each selection multiplexer and a second adder for each access selector for simultaneous loading of all switching stage and outlet stage memories and storage means, said first adder offsetting the address of each selection multiplexer from the address supplied by the most significant bits of the output binary word of said common addressing unit by a value proportional to the number of the switching group to which an access selector pertains, said second adder offsetting the address of each access selector by a value proportional to the number of the outlet group to which the access selector pertains.

4. The switching network according to claim 3, further comprising a third adder for said inlet stage and a fourth adder for said switching stage, said third adder offsetting the most significant bits in the read addresses of the marking memories of said inlet stage, and said fourth offsetting the most significant bits in the write addresses of the switching group memories and in the read addresses of the switching group marking memories.

5. The switching metwork according to claim 4, in which said address offsets are performed by adding the following to the most significant bits or the common addressing unit's output binary word: in said first adder the complement of said switching group number, in said second adder the complement of the outlet group address, in said third adder the module number, and in said fourth adder the switching group number, thereby loading data into the switching group memories in the same order as the inlet groups from which it is derived, and making it possible to load the marking memories without regard to the number of the module or switching group to which said memories pertain.

6. The switching network according to claim 1, wherein an inlet group's storage means comprises at least two memory blocks, each of which is served by a register of a capacity equal to one memory word, and which access from inlets of each group to said inlet storage means is through several stages to first selectors in each group which are stepped by the least significant binary bits of the binary word delivered by said common addressing unit, the outputs of said inlet group storage blocks being concentrated towards the single output of an inlet group output selector which is stepped by means of the most significant bit of the binary word delivered by said addressing unit so that the memory blocks of each group's inlet storage means are simultaneously loaded and successively read out to the output of each group.

7. The switching network according to claim 6, wherein the inputs to the system include wires for fault signalling, said wires being connected to the inputs of several stages of second selectors in each group organized according to the same structure as that of said first selectors to access each memory block of said inlet storage means from said second selectors controlled by a switch for each memory block, these switches being operated by the output of the last stage of said second selectors in the event of a fault being signalled so that the switches, which normally pass one word relating to one inlet into storage, will then recycle a predetermined bit so that the word relating to the fault channel will be repeated until the fault is cleared.

8. The switching network according to claim 6, wherein each outlet group's storage means comprises at least two memory blocks, but equal in number to the memory blocks of said inlet group storage means, each of which is served by a buffer register for bit-serial reading out of each word in said memory blocks, said memory blocks being loaded in succession and read simultaneously, access from each memory block to the network outlets served by said memory blocks is through a corresponding shift register and a set of output registers of the same capacity as said shift registers, each shift register output being connected to the same input of several output registers, selection of said output registers to receive bits being performed by a multiplexer addressed by said common addressing unit and receiving control pulses at its input.

* * * * *